June 2, 1931.  A. SMITH ET AL  1,808,688
AEROPLANE
Filed March 18, 1930    6 Sheets-Sheet 6
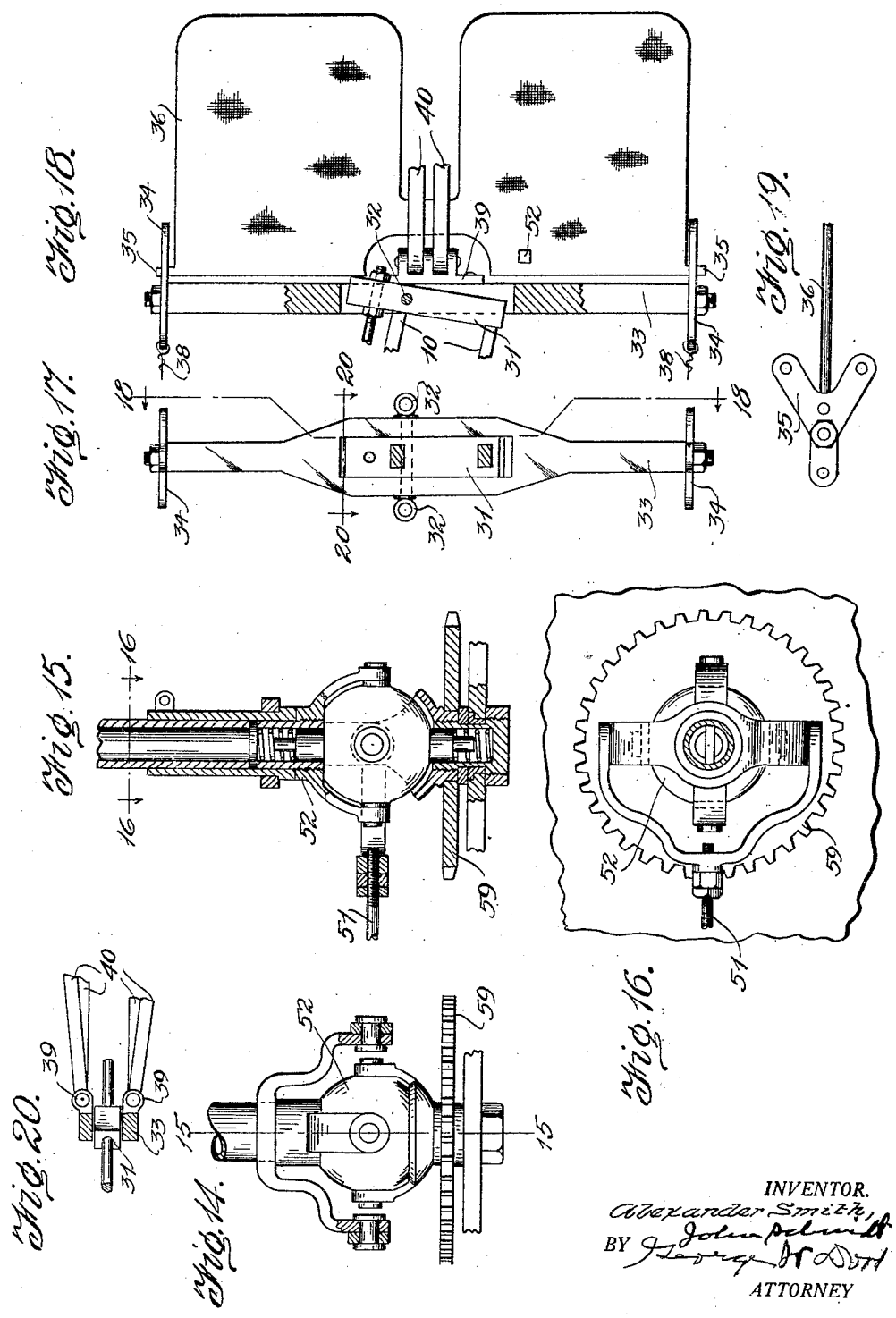

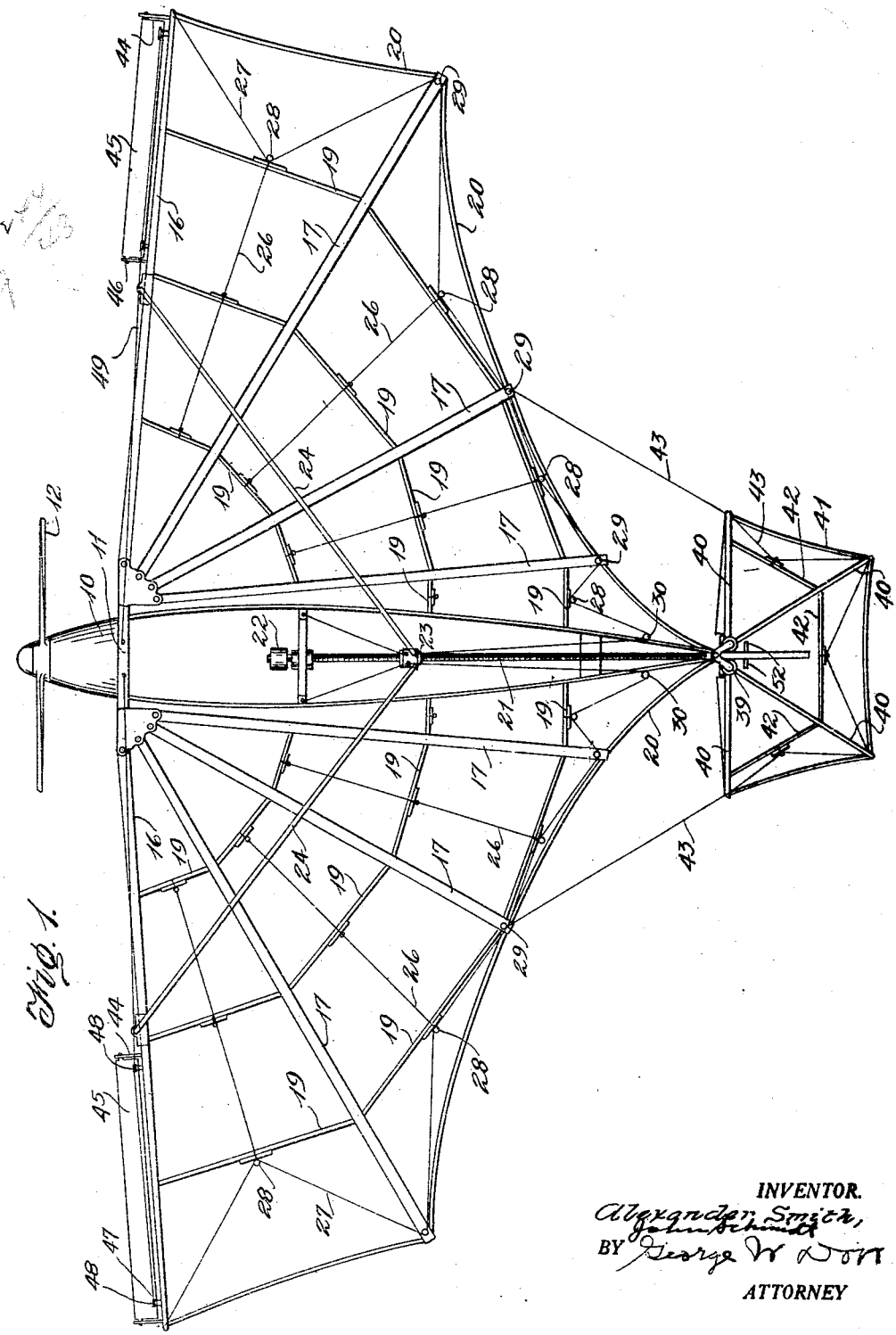

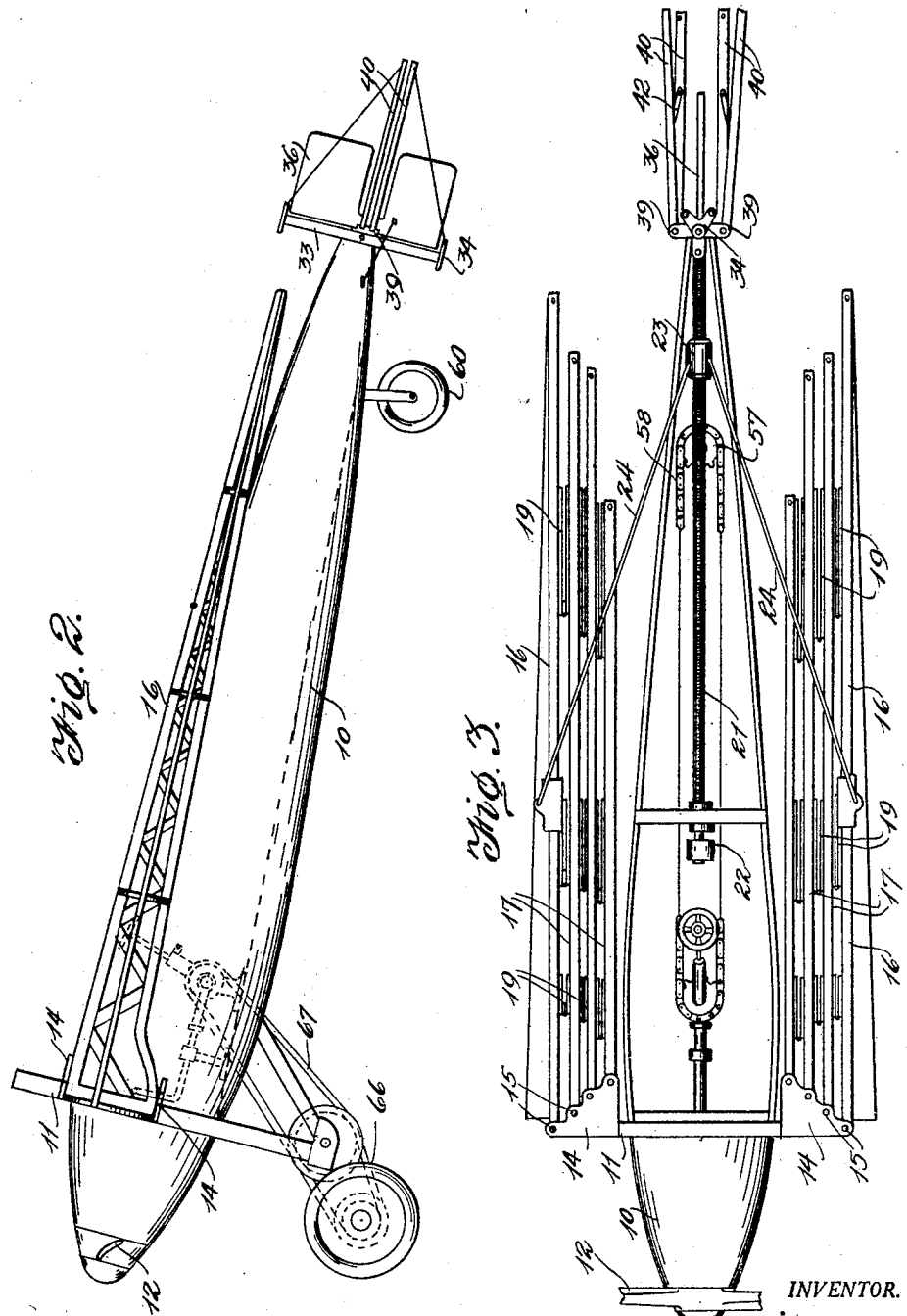

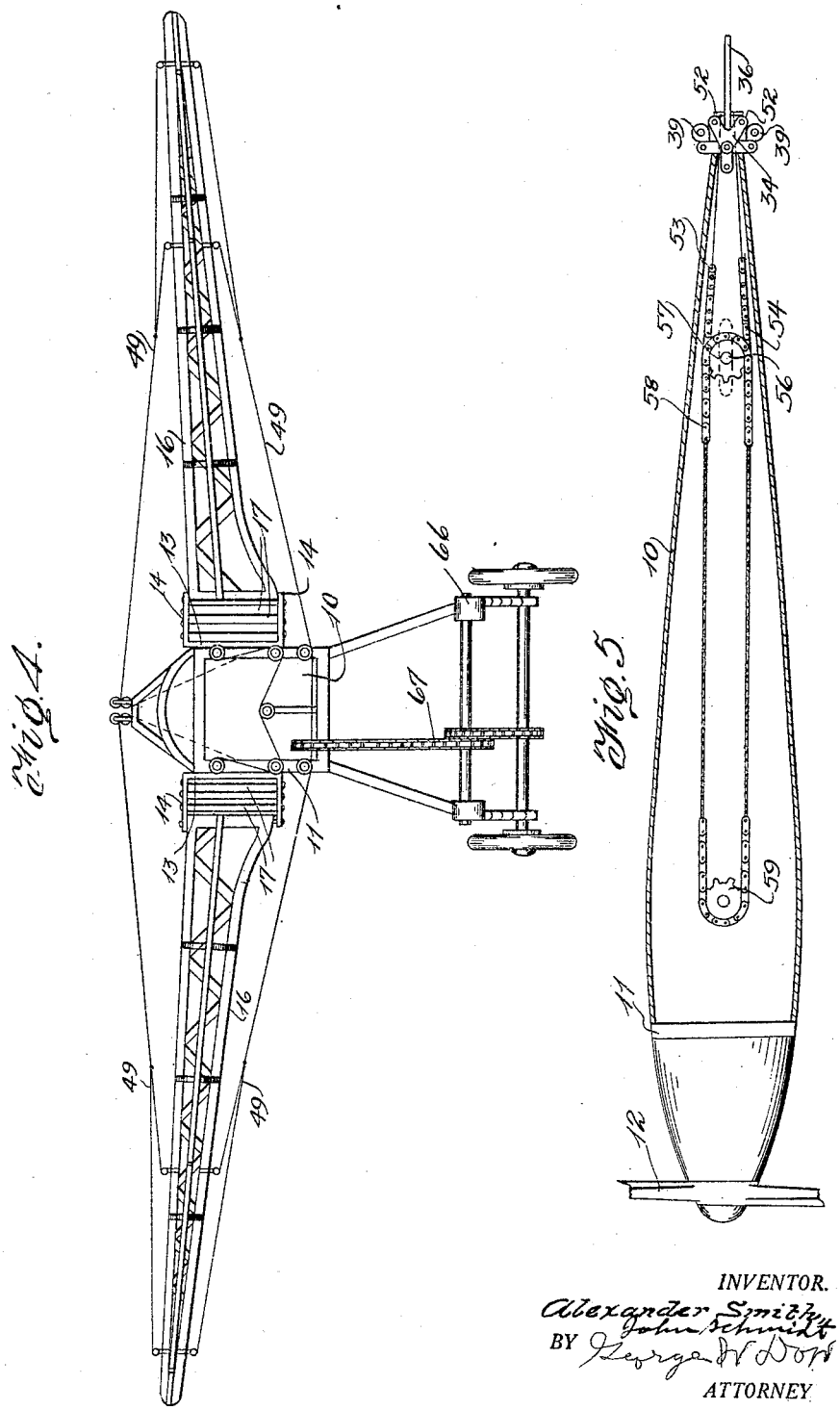

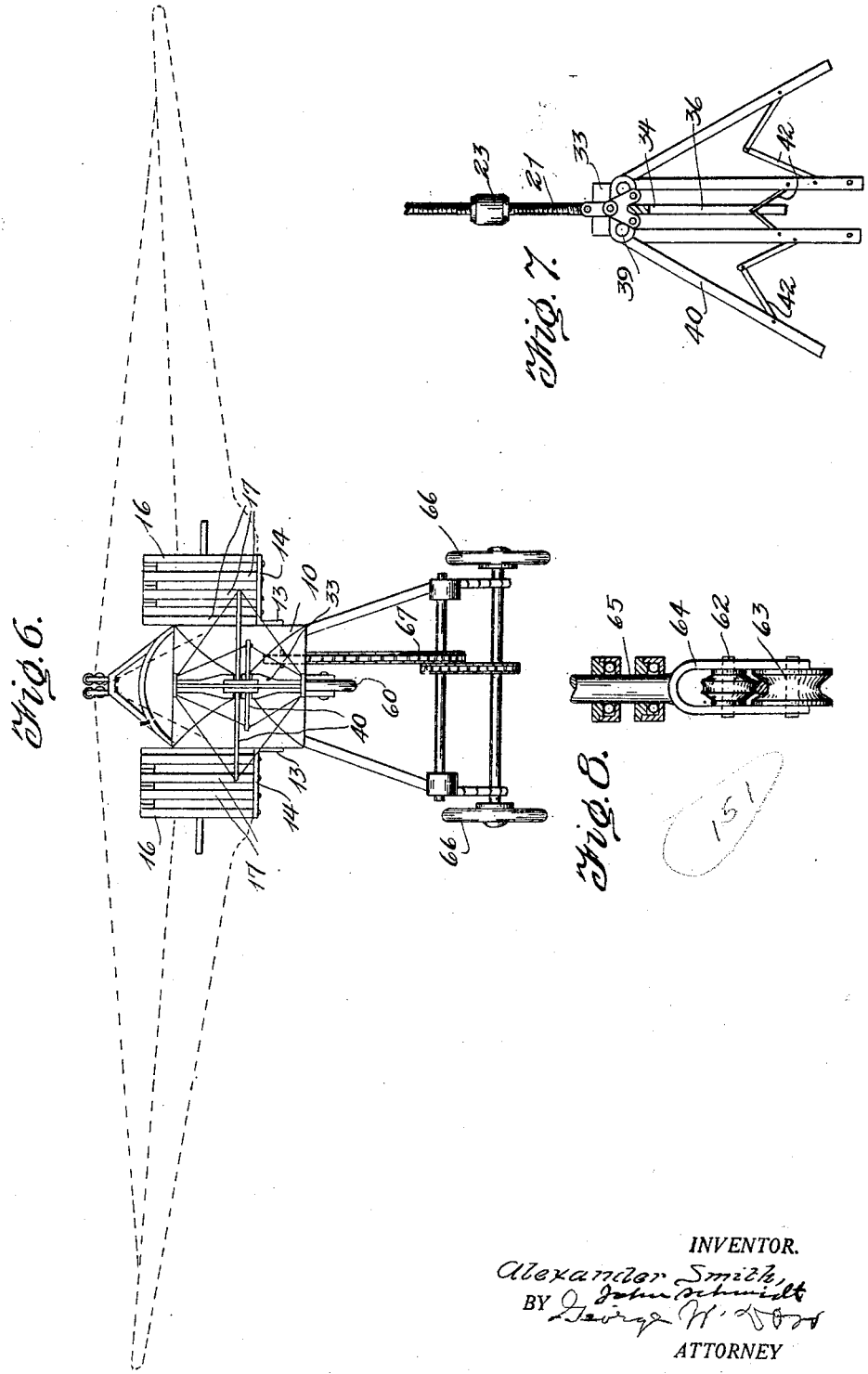

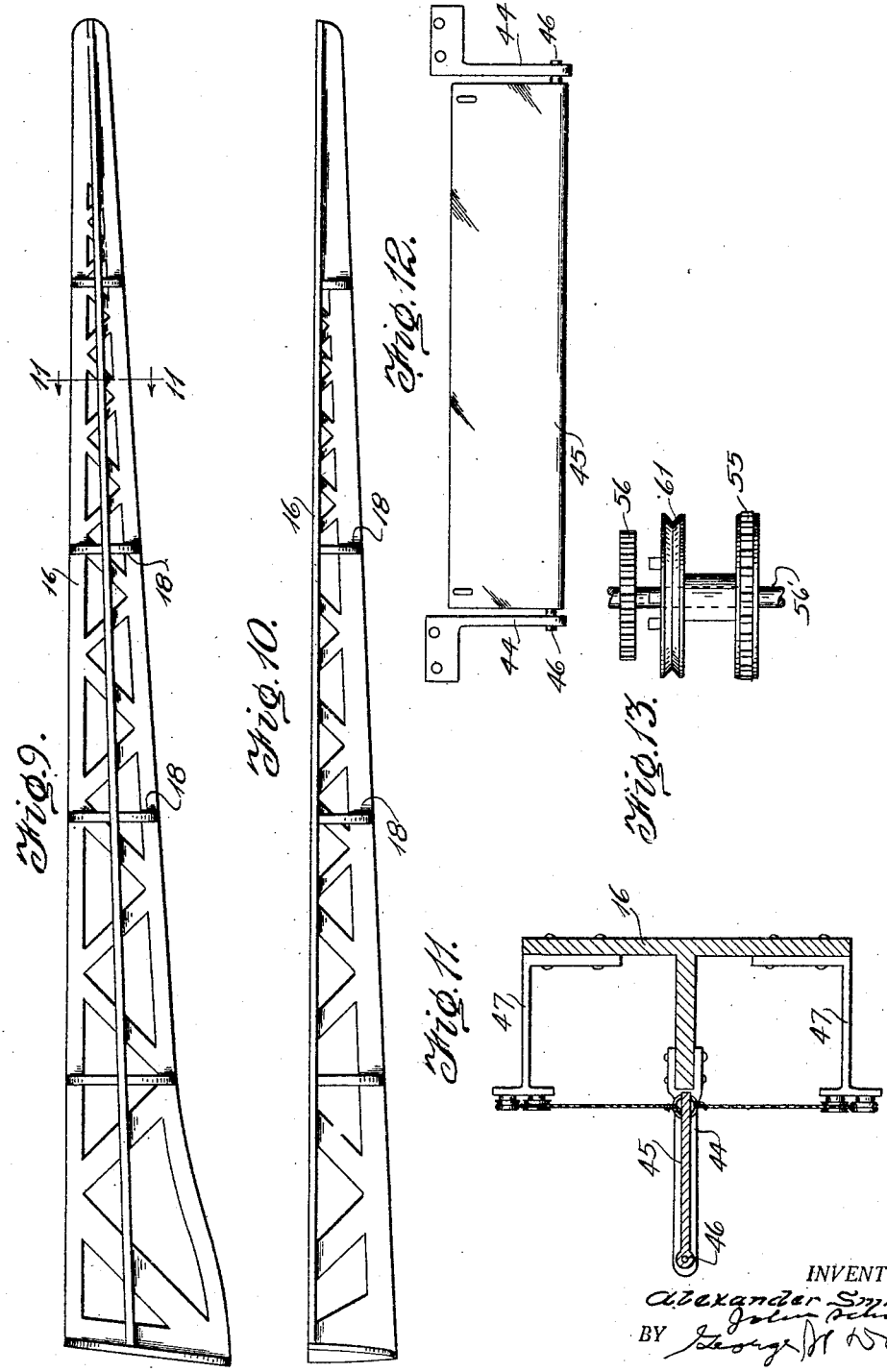

Patented June 2, 1931

1,808,688

UNITED STATES PATENT OFFICE

ALEXANDER SMITH, OF PITTSBURGH, PENNSYLVANIA, AND JOHN SCHMIDT, OF NEW YORK, N. Y.

AEROPLANE

Application filed March 18, 1930. Serial No. 436,871.

This invention relates to aeroplanes and has special reference to improvements in the aeroplane illustrated and described in prior Patent No. 1,730,249 of date October 1, 1929.

One important object of the present invention is to improve the construction of the wing spars in an aeroplane having folding wings.

A second important object of the invention is to provide improved means for completely expanding the wings of a folding wing aeroplane and for holding said wings securely in expanded position.

A third important object of the invention is to provide an improved folding wing arrangement for such aeroplanes wherein the wing spars, when folded, will lie parallel to each other and close to the side of the fuselage.

A fourth important object of the invention is to provide an improved form of wing flap or aileron for such aeroplanes to assist in maintaining lateral stability.

Another important object of the invention is an aeroplane that opens or folds while traveling without stopping same for any necessary adjustment of any kind.

With the above and other objects in view, the invention consists in general of certain novel details of construction and combinations of parts hereinafter fully described, illustrated in the accompanying drawings and specifically claimed.

In the drawings, like characters of reference indicate corresponding parts in the several views, and:—

Figure 1 is a plan view of the aeroplane with the wings spread, the wing and tail coverings being omitted from the upper sides of the spars;

Figure 2 is a side elevation of the aeroplane with the wings folded, the wing and tail coverings omitted;

Figure 3 is a plan view with the wings folded, the wing and tail coverings being omitted;

Figure 4 is a front elevation with the wing covers omitted;

Figure 5 is a section through the fuselage on the line 5—5 of Figure 2;

Figure 6 is a rear elevation of the aeroplane;

Figure 7 is a detail plan showing the tail partly folded;

Figure 8 is an enlarged detail of a guide or idler pulley arrangement used herewith;

Figure 9 is an enlarged front elevation of the front wing spar;

Figure 10 is a plan view of said front wing spar;

Figure 11 is an enlarged detail section on the line 11 of Figure 9;

Figure 12 is a plan view of an aileron used herewith;

Figure 13 is a detail elevation of part of the steering gear used herewith;

Figure 14 is a detail rear elevation, partly in section of the universal steering gear used herewith;

Figure 15 is a section on the line 15—15 of Figure 14;

Figure 16 is a section on the line 16—16 of Figure 15;

Figure 17 is a front elevation of the tail support;

Figure 18 is a section on the line 18—18 of Figure 17;

Figure 19 is a plan view thereof;

Figure 20 is a detail section on the line 20—20 of Figure 18.

The body 10 of this aeroplane is of the usual stream line form and is provided adjacent its forward end with a substantially square frame 11 for supporting certain wing brackets presently to be described. The usual propeller 12 and engine (not shown) are of course provided. Each of these wing brackets is provided with an upright web 13 by which it is attached to the frame 10 and has upper and lower fan shaped flanges 14 extending outwardly and rearwardly from the web. Spaced along axis adjacent the outer and rear edges of this flange are wing rib pivots 15 whereon are mounted on each bracket a main or forward wing rib 16 and a plurality of rear wing ribs 17. Each of the ribs 16 is T-shaped in cross section with the head of the T vertical and is of lattice construction as seen best in Figures 9 and 10. Also, stiffening ribs 18 are provided between the head and stem of the T as seen in said figures. Between the ribs on each side are arranged folding struts 19 each consisting of two sections pivoted to respective ribs and hinged together in the middle to fold toward the pivots of the ribs upon the wings being folded. These struts 19 are also arranged between the inner or rear rib and the body 10. The rib tips and rear of the body are connected by leach ropes or wires 20. Extending longitudinally of the body and suitably journalled for easy revolution is a screw 21. Any desired means may be used to revolve this screw, such a means being here indicated by the motor 22. On this screw is mounted a nut 23 which is connected to the main ribs 16 by pivoted struts 24 so that, as the nut moves forwardly and rearwardly, the main ribs will be expanded and collapsed. Also, since the hinge struts 19 connect these main ribs and the remaining ribs, this action of the nut aids in expanding and collapsing the wings throughout their structures. There are several folding struts 19 between each adjacent pair of ribs and each set thus positioned has the central pivots connected by a cord 26. Also each wing has a cord 27 connected to the tip of its main rib 16 and led thence in and out of the wing, passing alternately over idlers 28 on the outer folding struts 19 and idlers 29 on the tips of the remaining wing ribs. After leaving the last of the idlers 28 the cord for a wing passes around an idler 30 mounted on the body towards the rear and then passes forwardly and is secured to the nut 23. This cord system, and a similar system used for the tail as will be presently described, is shown only in Figure 1 to avoid confusion in the remaining figures where it might occur. It is also to be noted that the wings and tail will be covered with the usual wing fabric but this has not been shown since to do so would conceal the ribs and their connecting and operating structures which form important parts of this invention.

At the rear of the body 10 (Figures 17 and 18) there is provided a post 31 carrying a transverse shaft or pivot 32 on which the complete empennage is mounted. To this end there is provided a main member or support 33 recessed to receive the post 31 and provided at its top and bottom ends with gudgeon plates 34 wherein pivotally fit the pintles 35 of a rudder 36 provided centrally of its height with a slot 37 to permit its movement over the elevator. The plates 34 having the elevating wires 38 secured to them so that stress on either wire will effect corresponding tilting of the member 33. This member 33 also carries an elevator wing bracket 39 to which are connected pivotally the forward ends of elevator ribs 40. The free ends of these ribs are connected by the usual leach 41 and between the ribs are folding struts 42 (Figures 1 and 7) of the same character as the struts 19 and, like them, operated by cords 43 running over suitable idlers and connected to the cords 27 so that movement of the nut to expand the wings will correspondingly expand the elevator.

Ailerons are mounted on the forward edge of each main rib in the following manner. Each of the ribs (Figures 11 and 12) carries at its outer part a pair of forwardly projecting brackets 44 between which is located a flap or aileron provided at its forward corners with pintles 46 by which it is hinged at its forward edges to the front end of these brackets. Projecting forwardly from the vertical part of the rib 16 are the upper and lower brackets 47 carrying idlers 48 around which pass the aileron control cords or wires 49 which are connected to the rear edge portion of the aileron so that this portion may be raised or lowered at will. These cords are led over idlers 50 to the forwardly projecting arm of a universal control 51, the details of which are fully described in prior patent aforesaid, this device also having the elevator control cords attached thereto as shown in said prior patent.

Projecting from the sides of the rudder 36 are posts 52 to which connect steering wires 53, the wires having their free ends connected by a sprocket chain 54 passing around a sprocket 55 revolubly mounted on a steering post 56 (see Figures 5 and 13). This steering post has a sprocket 57 on its upper end which is connected by a chain and wire connection 58 with the sprocket 59 of the control 52. On its lower end the post 56 carries a ground wheel 60 which forms the steering wheel of the aeroplane when on the ground. A clutch 61 is arranged on the steering post so that the steering rudder may be released from steering movement when the machine is on the ground.

Preferably all guide pulleys are of the double form shown in Figure 8, two wheels 62 and 63, coactingly grooved, being supported in a fork 64 carried by a swivelly mounted stem 65.

A landing gear 66 and drive 67 are provided as in prior patent.

There has thus been provided a simple and efficient drive of the kind described and for the purpose specified.

It is obvious that many minor changes may be made in the form and construction of the invention without departing from the material principles thereof. It is not, therefore, desired to confine the invention to the exact form herein shown and described, but it is desired to include all such as come within the scope claimed.

We claim:—

1. In an aeroplane, a fuselage, wings attached to said fuselage, each including a series of ribs pivoted to the fuselage to be divergently arranged when spread, folding struts between adjacent spars of said wings, and means to spread said wings, simultaneously.

2. In an aeroplane, a fuselage, wings attached to said fuselage, each including a series of ribs pivoted to the fuselage to be divergently arranged when spread, folding struts between adjacent spars of said wings each of said struts consisting of a pair of hingedly connected sections each hinged to a respective rib, said sections being in abutting alinement upon the wings being spread, and means to spread said wings, simultaneously.

3. In an aeroplane, a fuselage, wings attached to said fuselage, each including a series of ribs pivoted to the fuselage to be divergently arranged when spread, folding struts between adjacent spars of said wings, each of said struts consisting of a pair of hingedly connected sections each hinged to a respective rib, said sections being in abutting alinement upon the wings being spread, and pull cords connected to the struts and arranged to effect simultaneous movement of all of the said struts to bring the sections of the respective struts into alinement.

4. In an aeroplane, a fuselage, wings attached to said fuselage, each including a series of ribs pivoted to the fuselage to be divergently arranged when spread, folding struts between adjacent spars of said wings, each of said struts consisting of a pair of hingedly connected sections each hinged to a respective rib, said sections being in abutting alinement upon the wings being spared, pull cords connected to the struts and arranged to effect simultaneous movement of all of the said struts to bring the sections of the respective struts into alinement, and other means to effect simultaneous movement of the forward wing spars between folded and spread positions.

5. In an aeroplane, a fuselage, wings attached to said fuselage, each including a series of ribs pivoted to the fuselage to be divergently arranged when spread, folding struts between adjacent spars of said wings, each of said struts consisting of a pair of hingedly connected sections each hinged to a respective rib, said sections being in abutting alinement upon the wings being spread, pulleys each carried by a strut at the joint between its sections, other pulleys each carried by the outer end of a rib, said last pulleys being carried by all ribs except the forward rib on each side of the fuselage, and cords each having one end attached to the outer end of the forward spar on a respective side of the fuselage and led around the strut and spar supported pulleys in alternation whereby drawing on the free ends of the cords will straighten the struts simultaneously.

6. In an aeroplane, a fuselage, wings attached to said fuselage, each including a series of ribs pivoted to the fuselage to be divergently arranged when spread, folding struts between adjacent spars of said wings, each of said struts consisting of a pair of hingedly connected sections each hinged to a respective rib, said sections being in abutting alinement upon the wings being spread, pulleys each carried by a strut at the joint between its sections, other pulleys each carried by the outer end of a rib, said last pulleys being carried by all ribs except the forward rib on each side of the fuselage, cords each having one end attached to the outer end of the forward spar on a respective side of the fuselage and led around the strut and spar supported pulleys in alternation whereby drawing on the free ends of the cords will straighten the struts simultaneously, a member guided for movement longitudinally of the aeroplane and having said cords attached thereto, and means to move said member.

7. In an aeroplane, a fuselage, wings attached to said fuselage, each including a series of ribs pivoted to the fuselage to be divergently arranged when spread, folding struts between adjacent spars of said wings, an elevator including a plurality of pivoted webs and folding struts to hold the ribs expanded, and means to spread said wings and elevator simultaneously.

8. In an aeroplane, a pair of folding wings each including a forwardly positioned main rib, a pair of spaced brackets projecting forwardly from the outer part of each rib, an aileron flap arranged between the brackets and having its forward edge portion pivoted to the forward ends of said brackets, other brackets projecting forwardly from the rib above and below the rear edges of the aileron, guide pulleys carried by the last named brackets, operating cords attached to the rear edge portion of the aileron and extending around the guide pulleys, and a control device operatively connected to said cords.

9. In an aeroplane, a fuselage, wings attached to said fuselage, each including a series of ribs pivoted to the fuselage to be divergently arranged when spread, folding struts between adjacent spars of said wings, an elevator including a plurality of pivoted webs and folding struts to hold the ribs expanded, means to spread said wings and elevator simultaneously, each of said struts consisting of a pair of hingedly connected sections each hinged to a respective rib, said sections being in abutting alinement upon the wings being spread, and means to spread said swings simultaneously.

10. In an aeroplane, a fuselage, wings attached to said fuselage, each including a series of ribs pivoted to the fuselage to be divergently arranged when spread, folding struts between adjacent spars of said wings, an elevator including a plurality of pivoted webs and folding struts to hold the ribs expanded, means to spread said wings and elevator simultaneously, each of said struts consisting of a pair of hingedly connected sections each hinged to a respective rib, said sections being in abutting alinement upon the wings being spread, and pull cords connected to the struts and arranged to effect simultaneous movement of all of the said struts to bring the sections of the respective struts into alinement.

11. In an aeroplane, a fuselage, wings attached to said fuselage, each including a series of ribs pivoted to the fuselage to be divergently arranged when spread, folding struts between adjacent spars of said wings, an elevator including a plurality of pivoted webs and folding struts to hold the ribs expanded, means to spread said wings and elevator simultaneously, each of said struts consisting of a pair of hingedly connected sections each hinged to a respective rib, said sections being in abutting alinement upon the wings being spread, pull cords connected to the struts and arranged to effect simultaneous movement of all of the said struts to bring the sections of the respective struts into alinement, and other means to effect simultaneous movement of the forward wing spars between folded and spread positions.

12. In an aeroplane, a fuselage, wings attached to said fuselage, each including a series of ribs pivoted to the fuselage to be divergently arranged when spread, folding struts between adjacent spars of said wings, an elevator including a plurality of pivoted webs and folding struts to hold the ribs expanded, means to spread said wings and elevator simultaneously, each of said struts consisting of a pair of hingedly connected sections each hinged to a respective rib, said sections being in abutting alinement upon the wings being spread, pulleys each carried by a strut at the point between its sections, other pulleys each carried by the outer end of a rib, said last pulleys being carried by all ribs except the forward rib on each side of the fuselage, and cords each having one end attached to the outer end of the forward spar on a respective side of the fuselage and led around the strut and spar supported pulleys in alternation whereby drawing on the free ends of the cords will straighten the struts simultaneously.

13. In an aeroplane, a fuselage, wings attached to said fuselage, each including a series of ribs pivoted to the fuselage to be divergently arranged when spread, folding struts between adjacent spars of said wings, an elevator including a plurality of pivoted webs and folding struts to hold the ribs expanded, means to spread said wings and elevator simultaneously, each of said struts consisting of a pair of hingedly connected sections each hinged to a respective rib, said sections being in abutting alinement upon the wings being spread, pulleys each carried by a strut at the point between its sections, other pulleys each carried by the outer end of a rib, said last pulleys being carried by all ribs except the forward rib on each side of the fuselage, cords each having one end attached to the outer end of the forward spar on a respective side of the fuselage and led around the strut and spar supported pulleys in alternation whereby drawing on the free ends of the cords will straighten the struts simultaneously, a member guided for movement longitudinally of the aeroplane and having said cords attached thereto, and means to move said member.

ALEXANDER SMITH.
JOHN SCHMIDT.